US012182669B2

United States Patent
Fogal et al.

(10) Patent No.: US 12,182,669 B2
(45) Date of Patent: Dec. 31, 2024

(54) MACHINE LEARNING MODEL COMPILER

(71) Applicant: Apple Inc., Cupertino, CA (US)

(72) Inventors: Thomas Fogal, Cupertino, CA (US); Adam Nemet, Mountain View, CA (US); Gerolf F. Hoflehner, San Jose, CA (US)

(73) Assignee: Apple Inc., Cupertino, CA (US)

( * ) Notice: Subject to any disclaimer, the term of this patent is extended or adjusted under 35 U.S.C. 154(b) by 997 days.

(21) Appl. No.: 17/094,772

(22) Filed: Nov. 10, 2020

(65) Prior Publication Data

US 2021/0398015 A1 Dec. 23, 2021

Related U.S. Application Data

(60) Provisional application No. 63/041,766, filed on Jun. 19, 2020.

(51) Int. Cl.
*G06F 8/41* (2018.01)
*G06N 20/00* (2019.01)
*G06F 16/245* (2019.01)

(52) U.S. Cl.
CPC ........... *G06N 20/00* (2019.01); *G06F 8/4434* (2013.01); *G06F 8/447* (2013.01); *G06F 8/47* (2013.01); *G06F 16/245* (2019.01)

(58) Field of Classification Search
None
See application file for complete search history.

(56) References Cited

U.S. PATENT DOCUMENTS

| | | | | |
|---|---|---|---|---|
| 11,080,200 B2* | 8/2021 | Wanner | .................. | G06N 3/063 |
| 11,210,073 B1* | 12/2021 | Capellman | .............. | G06F 18/24 |
| 11,429,902 B2* | 8/2022 | Liu | ........................ | G06N 20/00 |
| 2014/0280030 A1* | 9/2014 | Freedman | ......... | G06F 16/24542 707/718 |
| 2018/0349109 A1 | 12/2018 | Brown et al. | | |
| 2018/0349114 A1* | 12/2018 | Brown | .................. | G06N 20/00 |
| 2018/0350028 A1* | 12/2018 | Chiu | ........................ | G06F 8/47 |
| 2019/0391796 A1* | 12/2019 | Brady | ..................... | G06F 8/458 |
| 2020/0334083 A1* | 10/2020 | Liu | ........................... | G06F 8/45 |

(Continued)

FOREIGN PATENT DOCUMENTS

| | | | |
|---|---|---|---|
| CN | 109669701 A | 4/2019 | |
| CN | 109961151 A | 7/2019 | |
| CN | 110709816 A | 1/2020 | |

OTHER PUBLICATIONS

Mangiavacchi, "Use Apple new ML Compute framework to accelerate ML training and inferencing on iOS and macOS," Jul. 2020, retrieved from https://towardsdatascience.com/use-apple-new-ml-compute-framework-to-accelerate-ml-training-and-inferencing-on-ios-and-macos-8b7b84f63031, 8 pages.

(Continued)

*Primary Examiner* — Marina Lee
(74) *Attorney, Agent, or Firm* — BAKERHOSTETLER

(57) ABSTRACT

The subject technology provides a framework for executable machine learning models that are executable in a zero-runtime operating environment. This allows the machine learning models to be deployed in limited memory environments such as embedded domains. A machine learning compiler is provided to generate the executable machine learning models.

20 Claims, 6 Drawing Sheets

(56) References Cited

U.S. PATENT DOCUMENTS

2021/0295191 A1* 9/2021 Bui ..................... G06V 10/751
2022/0303176 A1* 9/2022 Pandey ................ G06N 3/0464

OTHER PUBLICATIONS

Yegulalp, "What is LLVM? The power behind Swift, Rust, Clang, and more," InfoWorld, Mar. 2020, retrieved from https://www.infoworld.com/article/3247799/what-is-llvm-the-power-behind-swift-rust-clang-and-more.html, 9 pages.
European Office Action from European Patent Application No. 21721303.2, dated Aug. 23, 2023, 6 pages.
Gopinath, et al., "Compiling KB-sized machine learning models to tiny IoT devices," Programming Language Design and Implementation, ACM, Jun. 2019, pp. 79-95.
International Search Report and Written Opinion from PCT/US2021/025417, dated Jul. 16, 2021, 13 pages.
Chinese Office Action from Chinese Patent Application No. 202110522532.1, dated Oct. 29, 2024, 11 pages including English language translation.

* cited by examiner

MACHINE LEARNING MODEL COMPILER

TECHNICAL FIELD

This application claims the benefit of priority to U.S. Provisional Patent Application No. 63/041,766 entitled "Machine Learning Model Compiler," filed on Jun. 19, 2020, the disclosure of which is hereby incorporated herein in its entirety.

TECHNICAL FIELD

The present description generally relates to machine learning and, more particularly, to a machine learning model compiler.

BACKGROUND

Software engineers and scientists have been using computer hardware for machine learning to make improvements across different industry applications. To aid in the design of and development of machine learning models, machine learning libraries are sometimes provided that include machine learning functions that can be obtained and interpreted at runtime for the machine learning model.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
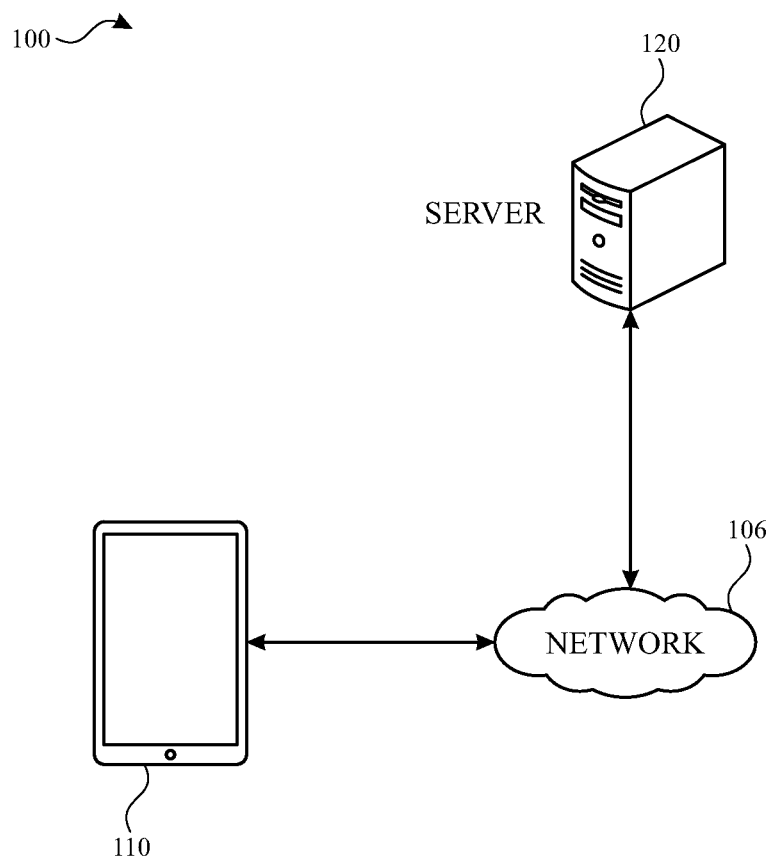
FIG. 1 illustrates an example network environment in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Machine learning has seen a significant rise in popularity in recent years due to the availability of massive amounts of training data, and advances in more powerful and efficient computing hardware. Machine learning may utilize models such as neural networks that are trained and then executed to provide predictions in particular applications (e.g., analyzing images and videos, voices, object detection and/or tracking, etc.) among many other types of applications. However, it can be challenging to provide machine learning in hardware limited environments such as in devices with low power or limited memory processing environments.

For example, embedded domains present unique challenges to existing machine learning frameworks that can impede deployment of machine learning models. Limited power budgets impose limits on the processing power and memory bandwidth. In these embedded domains, traditional operating systems are eschewed, such that traditionally relied-upon system calls may be unavailable, and often there is no file system through which external resources may be loaded.

Despite these and other hardware limitations, it is frequently desirable to embed machine learning directly into firmware that has real-time constraints (e.g., restrictions on the timings of computations, such that the computations occur one time relative to other computations). One of the most challenging limitations is size: machine learning models must fit in extremely small memory footprints to be viable in embedded devices, in some scenarios. Every byte of runtime environment needed for executing the machine learning model impacts the available number of weights in the machine learning mode, and therefore indirectly affects the accuracy of models deployed in these environments.

In accordance with aspects of the subject disclosure, a machine learning compiler is provided to generate self-contained executable machine learning models that substantially reduce or eliminate the need for and use of runtime environments altogether.

In accordance with aspects of the subject disclosure, executable machine learning models are provided that can be run in small memory and/or low power environments (e.g., including on wearable devices such as smart watches and/or on earbuds with limited-power limited-memory processors). The executable machine learning models can be generated by compiling machine learning models generated using a machine learning library, to compile a compilable (e.g., object oriented) code version of the model. This compilable code can then be compiled and packaged to provide an executable machine learning model that can be executed without runtime calls to library functions and/or other runtime environment features.

Compiling all of the operations for the machine learning model in this way also provides additional opportunities for optimization of the model. For example, the process of including all of the operations for the machine learning model in the compilable source code for the executable machine learning model allows exploitation of knowledge about the connections between layers of the models to optimize operations across layers. Existing machine learning models are often executed using an interpreter that can optimize individual operations, but is not aware of the upcoming operations of the next layer and thus is unable to optimized across layers. The reduction or elimination of the runtime environment, the resulting additional opportunities for optimization (e.g., including arbitrary fusion abilities) as described in further detail hereinafter, provide the ability to deploy machine learning to extremely small embedded devices.

FIG. 1 illustrates an example network environment 100 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110 and a server 120. The network 106 may communicatively (directly or indirectly) couple the electronic device 110 and/or the server 120. In one or more implementations, the network 106 may be an interconnected network of devices that may include, or may be communicatively coupled to, the Internet. For explanatory purposes, the network environment 100 is illustrated in FIG. 1 as including the electronic device 110, and the server 120; however, the network environment 100 may include any number of electronic devices and any number of servers.

The electronic device 110 may be, for example, a desktop computer, a portable computing device such as a laptop computer, a smartphone, a peripheral device (e.g., a digital camera, headphones, earbuds), a tablet device, a wearable device such as a smart watch, a smart band, and the like. In FIG. 1, by way of example, the electronic device 110 is depicted as a mobile electronic device (e.g., a smartphone). The electronic device 110 may be, and/or may include all or part of, the electronic system discussed below with respect to FIG. 2 and/or FIG. 11.

In one or more implementations, the electronic device 110 may provide a system for generating and/or executing executable machine learning models that can be executed in a zero-runtime operating environment (e.g., in an operating environment that does not include a runtime environment and/or runtime libraries that are separate from the executable machine learning models and/or that are provided by an operating system). Executing an executable machine learning model in a zero-runtime operating environment may include executing the executable machine learning model without accessing a runtime library (e.g., in an operating environment that does not include a runtime library). Further, the electronic device 110 may provide one or more machine learning frameworks for training machine learning models and/or developing applications using such machine learning models (e.g., machine learning models implementing the neural networks). In an example, such machine learning frameworks can provide various machine learning algorithms and models for different problem domains in machine learning. In an example, the electronic device 110 may include a deployed executable machine learning model that provides an output of data corresponding to a prediction or some other type of machine learning output. In an implementation, the electronic device 110 utilizes the trained executable machine learning model and continually learns/re-trains the model over time.

Figure 2:
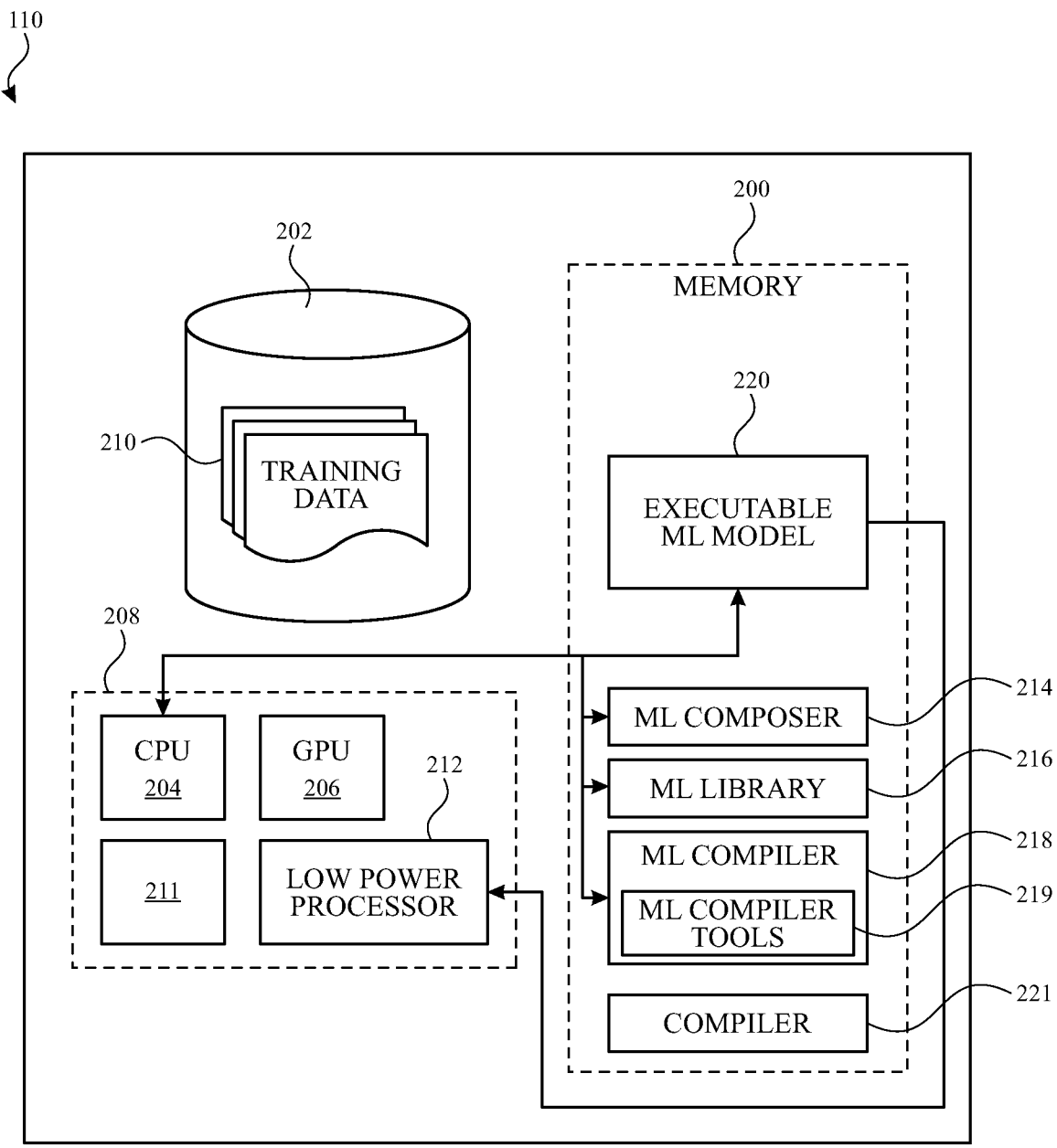
FIG. 2 illustrates an example computing architecture for a system for generating and running executable machine learning models in accordance with one or more implementations.

FIG. 2 illustrates an example computing architecture for a system for generating and/or executing executable machine learning models, in accordance with one or more implementations. For explanatory purposes, the computing architecture is described as being provided by the electronic device 110; however, the computing architecture may be implemented by any other electronic devices, such as desktop computers, laptop computers, wearable devices, tablet computers, or the like. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the electronic device 110 may include memory 200 storing an executable machine learning (ML) model 220. In one or more implementations, electronic device 110 may include memory 202 storing training data 210 and/or other input data for training the executable machine learning model 220 and/or training a machine learning model that can be compiled to form the executable machine learning model 220. In various implementations, training of the machine learning model can be performed before or after the machine learning model is compiled to form the executable machine learning model. In one or more implementations, the executable ML model 220 may be a trained machine learning model that has been compiled by a machine learning compiler 218 at electronic device 110 or at another device and includes parameters (e.g., weights, biases, etc., associated with nodes of a neural network) that have been trained at the electronic device 110 and/or at another device/system and provided to the electronic device 110.

In the example of FIG. 2, electronic device 110 includes processing circuitry 208. As shown, processing circuitry 208 can include a central processing unit 204 (e.g., a CPU), a graphics processing unit 206 (e.g., a GPU), and a low power processor 212.

In an example, low power processor 212 may be a small and low power auxiliary processor (and/or ASIC) that can be persistently (or constantly) powered to detect motion of a device or to detect and/or interpret touch, audio, or other input data for control of the device, as provided in an electronic device such as a smartphone, a wearable device such as a smart watch, or an audio device such as headphones or earbuds. In one or more implementations, the low power processor 212 may be configured to use less power than the CPU 204 and/or the GPU 206. In one or more implementations, the low power processor 212 may have less on-chip cache available than the CPU 204 or the GPU 206. In an example, low power processor 212 can be an Always On Processor (AOP), which is a small and low power auxiliary processor that is implemented as an embedded motion coprocessor, as provided in an electronic device such as an iPhone® or AirPods®. The executable machine learning model 220 may be executable, by the low power processor 212 in a zero-runtime operating environment (e.g., without accessing runtime libraries or resources that are not self-contained within the executable machine learning model 220).

As shown in FIG. 2, processing circuitry 208 may also include local memory 211, such as memory cache that is accessible by one or more of the CPU 204, the GPU 206, and/or the low power processor 212. In one or more implementations, processing circuitry 208 may be implemented using multiple separate chips corresponding to the CPU 204, the GPU 206, and the low power processor 212. In one or more implementations, the low power processor 212 may be provided without providing the CPU 204 or the GPU 206. In one or more implementations, the low power processor 212 may be configured to remain active (e.g., executing the executable ML model 220 for audio trigger detection, motion detection, etc.) while the CPU 204 and the GPU 206 are inactive (e.g., in a sleep state for electronic device 110). In one or more implementations, processing circuitry 208 may be formed from a single processor complex with different core types or multiple processors of differing types. For example, a processor complex may include a multiprocessing system having multiple clusters of cores, each cluster having one or more cores of a core type, interconnected with one or more buses and/or a memory fabric interconnect.

As shown in FIG. 2, a machine learning composer 214 (ML composer) may be provided (e.g., for execution by one or more of CPU 204 or GPU 206 from code stored in memory 200). The ML composer 214 may be a developer tool for machine learning developers by which one or more previously stored ML library functions from a ML library 216 stored in memory 200 can be obtained and/combined to construct and/or train a machine learning model. For example, the ML composer can include a tool to include calls to ML library functions in the ML library 216 in a ML developer language document that can be executed by an interpreter. At runtime for a ML model implemented in such as document, the interpreter may obtain and execute (e.g., using CPU 204 and/or GPU 206) the ML library functions according to the machine learning model, as described in the ML developer language document.

However, a ML developer language document, and the ML library 216 and/or runtime libraries for running the associated model, may be too large to implement using, for example, the low power processor 212 (e.g., too large to implement using the memory resources and/or processing resources of the low power processor). For example, the low power processor 212 may not have enough memory for the entire runtime library. A machine learning compiler 218 (ML compiler) may be provided (e.g., for execution by one or more of CPU 204 or GPU 206 from code stored in memory 200) to compile (e.g., using ML compiler tools 219) the machine learning model generated by the ML composer 214 (or generated in another manner). Compiling the ML developer language document generates the executable ML model 220, having a smaller memory footprint than the ML developer language document and associated library(ies), and that can be executed using the low power processor 212 (e.g., in a zero-runtime operating environment). For example, the ML compiler 218 may generate the kernels needed bespoke for that ML model 220 (e.g., by creating a record on-the-fly based on what the model creator asked for in the ML model 220). In one or more implementations, for portions of the compilation process, the ML compiler 218 may operate a separate compiler such as compiler 221 (e.g., a conventional compiler for compilable code such as structure oriented code such as object oriented code, functional code, or code in any languages that allows compiling of a standalone executable) to generate machine code for machine learning kernels and/or wrappers for the machine learning kernels that can be packaged by the ML compiler 218 to form the executable ML model 220.

Figure 3:
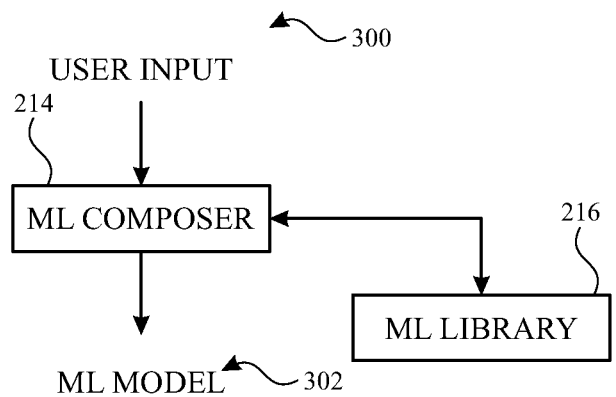
FIG. 3 illustrates a schematic flow diagram for generating a machine learning model in accordance with one or more implementations.

FIG. 3 illustrates a schematic flow diagram of an example process for generating an ML model using ML composer 214. As shown, user input 300 may be provided to ML composer 214 for selecting and/or integrating one or more ML library functions from ML library 216 (e.g., ML library functions for computer vision, natural language processing, sound classification activity classification, labeling, estimating, finding similarities, visualization, activation layers, convolution layers, fully connected layers, pooling layers, memory management, etc.) into a ML model 302. For example, the ML composer 214 may generate the ML model 302 by generating a ML language document that includes function calls to the ML library functions from ML library 216, that can be executed by an interpreter. ML composer 214 may also provide tools for training the model.

Figure 4:
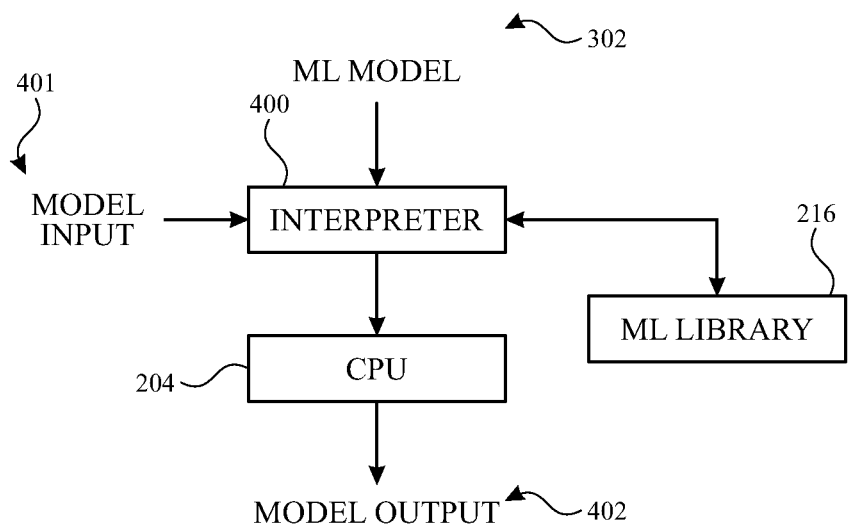
FIG. 4 illustrates a schematic flow diagram for executing a machine learning model in accordance with one or more implementations.

FIG. 4 illustrates an example processes in which the ML model 302 (e.g., from ML composer 214) is executed by an interpreter 400 (e.g., an interpreter at electronic device 110 or another electronic device or system). As shown, the interpreter 400 may receive a model input 401 (e.g., image data for a computer vision ML model, audio data for a voice recognition ML model, etc.) and the ML model 302, and may (e.g., according to the ML model), obtain, optimize, and/or execute ML library functions from ML library 216 to generate a model output 402 using CPU 204.

Figure 5:
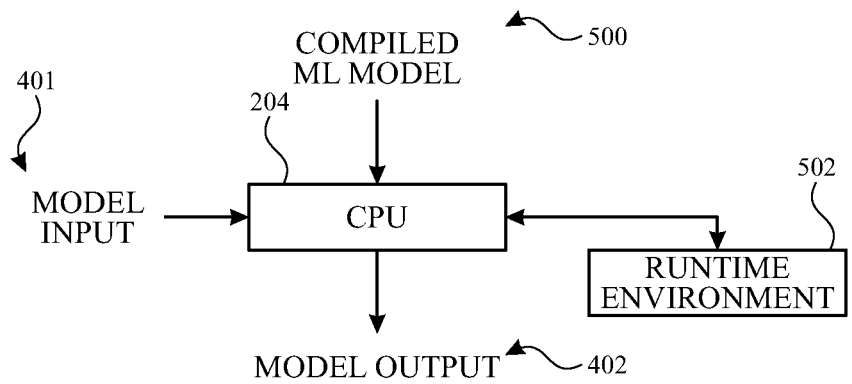
FIG. 5 illustrates a schematic flow diagram for executing a compiled ML model using a runtime library in accordance with one or more implementations.

As shown in FIG. 5, in order to reduce the memory footprint of the ML model, in an implementation, the ML model 302 can be compiled for execution by CPU 204 (e.g., without using interpreter 400), such as by inserting calls to a runtime environment 502 into a compiled ML model 500 (e.g., a compiled executable binary including the calls to a runtime environment 502). The runtime environment 502 can include runtime library functions corresponding to any of the ML library functions from ML library 216 that may be used by any ML model, and/or additional runtime library functions such as graphical functions, mathematical functions, etc.

However, even reducing the memory footprint as illustrated in FIG. 5 still requires sufficient memory for the runtime environment 502 to be loaded into memory during execution of the compiled ML model 500, and for communication between the executable binary and the runtime environment, which can be prohibitive for execution by a low power processor such as low power processor 212.

Figure 6:
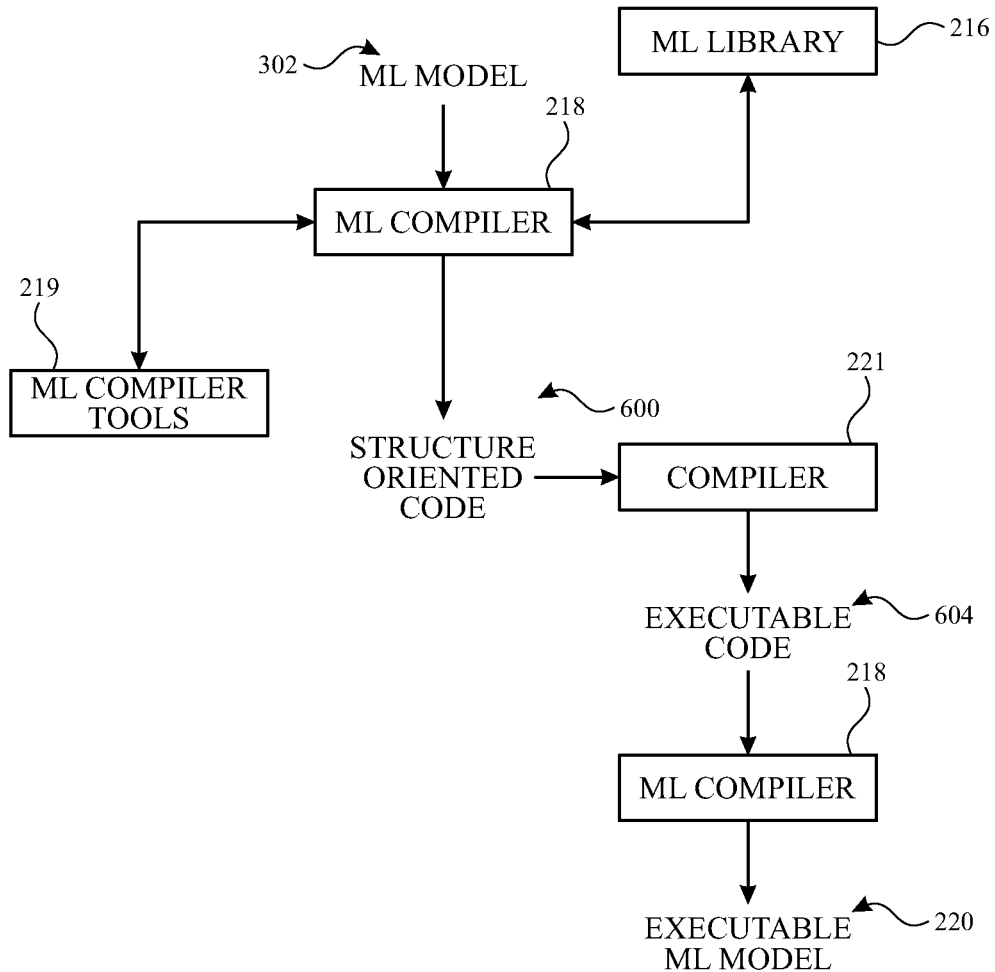
FIG. 6 illustrates a schematic flow diagram for generating an executable machine learning model in accordance with one or more implementations.

In accordance with one or more implementations, a solution is provided to reduce or eliminate the need for and use of the runtime environment altogether. For example, as illustrated in FIG. 6, in one or more implementations, the ML compiler 218 transforms a ML model 302 (e.g., from ML composer 214) into (e.g., self-contained) compilable source code 600 (e.g., compilable source code such as object oriented code such as C code, and/or intermediate representation code for later use by a separate compiler 221) that implements the network. For example, ML compiler 218 may identify and include (e.g., in the compilable source code 600) only a portion of a runtime library or another code library that is accessible for developing the model. For example, the portion of a code library that is included by the ML compiler 218 in the compilable source code 600 may include only the portion of that code library that is actually used by the ML model 302 (e.g., without including other unused portions of the library). For example, the resulting compilable source code 600 can then be compiled independently by a separate compiler, such as compiler 221, to generate executable code 604 (e.g., a set of machine learning kernels, and wrapper code for the set of machine learning kernels) that can be packaged by ML compiler 218 and deployed to any environment. For example, compiler 221 may be controlled by ML compiler 218 (e.g., by ML compiler tools 219) to generate and return one or more pieces of executable code 604 (e.g., machine code) to ML compiler 218, which packages up a container of the executable code to form the executable ML model 220 (e.g., a container that includes a set of kernels and machine code wrapper for the kernels and provides a network interface that a user can call). In this way, the ML compiler 218 can obviate the need to hand-develop a bespoke ML solution (e.g., in a structure oriented or other compilable language), and thereby delivers productivity gains for teams deploying ML in limited environments. This can be especially valuable when multiple iterations of a model are explored to optimize among accuracy, model size, and model performance.

Neural network performance bottlenecks can often be divided into compute-bound regions (where the ability of the processor to execute instructions is what bounds performance) and memory-bound regions (where the ability of the memory subsystem to provide data is what bounds performance). The ML compiler 218 can utilize ML compiler tools 219 to optimize the performance of the executable ML model 220. For example, ML compiler tools 219 may include a front-end tool for optimizing operations-level aspects of the compilable source code 600 (e.g., by combining ML and/or underlying operations, and/or performing memory layout and alignment operations) and/or for determining how loop operations (e.g., sets of nested loops) should be optimized. ML compiler tools 219 may include a loop optimizer, a loop interface tool for operating the loop optimizer for transforming compute-bound networks into memory-bound networks, and/or one or more additional tools such as profiling tools.

The loop interface of the ML compiler tools 219 (see, e.g., loop interface 802 of FIG. 8) may provide a loop optimization framework that generates bespoke kernels for the input neural network and provides a large pool of optimizations to extract maximum performance. The loop interface may allow the ML compiler 218 to fuse arbitrary operations into a single kernel, keeping tensor data in registers and significantly reducing memory bandwidth. For some network configurations, fusing (e.g., arbitrary) operations in this manner removes the need to instantiate an explicit tensor, thereby lowering memory requirements.

Using these approaches (e.g., (i) generating a compilable version of the ML model, (ii) multi-level optimization of the structure-oriented code, including kernel generation by the loop interface, and (iii) compiling all of the code and resources for a ML model into a standalone executable ML model such as executable ML model 220) in concert enables the ML compiler to create high-performance zero-overhead implementations of machine learning models.

Figure 7:
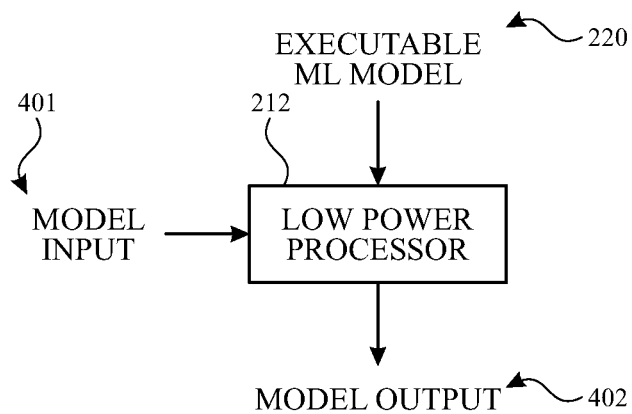
FIG. 7 illustrates a schematic flow diagram for executing an executable machine learning model in accordance with one or more implementations.

FIG. 7 schematically illustrates a process by which the executable ML model 220 can be executed by a processor such as low power processor 212. As shown, the executable ML model 220 and model input 401 for the executable ML model can be provided to the low power processor 212, which can generate a model output 402 using only the executable ML model 220, and without access to a runtime environment such as the runtime environment 502 of FIG. 5. For example, ML compiler 218 can include, in the executable ML model 220, a subset of a runtime library that is used by the machine learning model (e.g., so that the entire runtime library does not need to be loaded into memory for execution of the ML model). In this way, memory is only used for the exact operations performed by the executable ML model 220, without requiring storing of runtime library information that is not used by the executable ML model 220, and without the memory bandwidth usage of accessing the runtime environment.

The compiler-based approach to optimizing machine learning, the zero-runtime solution the ML compiler 218 generates (e.g., in which the resulting executable model includes only the resources it uses, in contrast with interpreted models), and the kernel generation technology, optimization technology, and profiling technology of the ML compiler tools 219 can provide various advantages that allow the processes illustrated in FIGS. 6 and 7 to produce high-performance, minimal overhead ML solutions.

Figure 8:
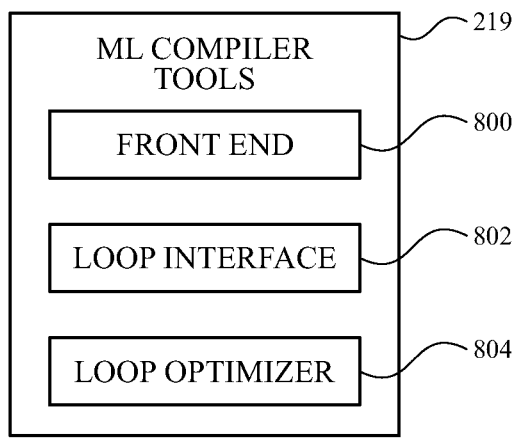
FIG. 8 illustrates aspects of ML compiler tools for an ML compiler in accordance with one or more implementations.

FIG. 8 is a schematic diagram illustrating aspects of the ML compiler tools 219. As shown, ML compiler tools 219 may include a front end 800, a loop interface 802, and a loop optimizer 804. In one or more implementations, ML compiler 218 (e.g., in ML compiler tools 219) may also include profiling tools to aid users in tuning machine learning models.

Front end 800 may be an interface for the ML compiler 218 between the ML model 302, the ML library 216, one or more other code libraries such as runtime libraries that include code referenced by the ML model 302 and/or the ML library, and the other ML compiler tools 219. For example, ML compiler 318 may operate front end 800 to optimize compilable source code such as compilable source code 600, and to perform other processes to compile the ML model including the optimized code all as one (e.g., so that the executable ML model 220 is a standalone, zero-runtime ML model).

Because all of the operations for the model, including the library operations, can be included by front end 800 in the compilable source code 600 that is compiled to form an executable ML model, optimization of the operations within that code can be based on operations before and/or after a particular operation, rather than the limited per operation optimization that may be performed by an interpreter.

For example, front end 800 of ML compiler 218 may take a description of a model, optimize the description at an operations level, and break the optimized operations down into smaller steps for optimization by the loop interface 802. Optimizing at the operations level may include, as examples, determining whether to pad a tensor (e.g., pad a tensor with blank space to align for vector operations) and/or arranging the location of transpose operations. Front end 800 may generate directions for how to optimize nested loops in the operations for the ML model, for example, by choosing scheduling directives (e.g., lowering decisions) for mapping a kernel into loops and for combining and/or modifying loops. The scheduling directives may include directions to unroll or strip mine loops, and/or to instantiate one or more internal tensors. Front end 800 may generate the directions in part by using heuristics in ML compiler itself to optimize at the operations level, break down operations into nested loops and look for options for optimization between loops, and detect opportunities for optimizations further down from loops (e.g., until getting down to the level of machine instructions/machine code).

Loop interface 802 may receive the directions to optimize loops from front end 800 and operate loop optimizer 804 based on the directions, for optimization at the loop level. Front end 800 and/or loop interface 802 may generate directions (e.g., for loop interface 802 and/or for loop optimizer 804) to optimize sets of nested loops across multiple operations and/or multiple layers of the ML model that would not be possible without the ML compiler front end operations to pull in all of the code for a standalone model.

Figure 9:
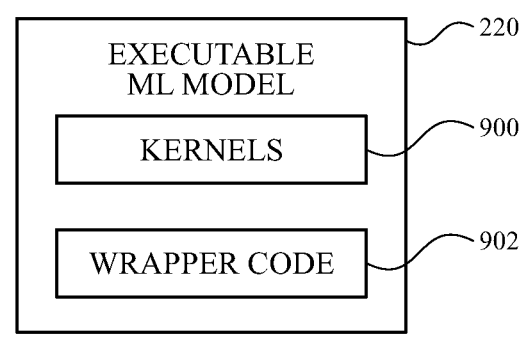
FIG. 9 illustrates aspects of an executable ML model in accordance with one or more implementations.

The loop interface 802 may be an underlying kernel generator inside of ML compiler 218. Loop interface 802 may be configured to generate a set of kernels 900 (e.g., machine learning kernels) and wrapper code 902 that ties the kernels together for the executable ML model 220 (e.g., as illustrated in FIG. 9).

The loop interface 802 may operate the loop optimizer 804 to transform, fuse, reorder, and/or restructure loops according to the directions from front end 800. This allows the ML compiler 218 to choose optimizations on a per loop level. This fine grain choice opportunity provided by the ML compiler 218 can be important for simultaneously optimizing performance while reducing the memory footprint of an ML model.

In one or more implementations, the loop interface 802 may receive, as input, (e.g., from front end 800), a loop nest (e.g., a set of nested loops), and directions (e.g., scheduling directives) for how to optimize loop nest. The loop interface 802 may map ML specific loop nests received from front end 800 onto a different domain that may be the optimization focus of the loop optimizer in the absence of the loop interface 802. The loop interface 802 may obtain optimized versions of the loop nests from the loop optimizer 804, and may further break down the output of the loop optimizer into compilable code such as C code, intermediate representation code for the compiler 221, and/or other compilable code.

In one or more implementations, front end 800 and/or loop interface 802 can fuse operations and subsequent operations into a single more complex operation, using multiple optimizations. This can reduce or eliminate each memory traffic resulting from each individual operation reading from memory, writing out results, etc., instead of allowing intermediate values to be held in hardware registers. In one or more implementations, front end 800 and/or loop interface 802 can simplify operations, such as arithmetic simplifications (e.g., by folding).

In one or more implementations, front end 800 and/or loop interface 802 can determine (e.g., for control of loop optimizer 804 by loop interface 802) an effective balance between fusion, unrolling, and instantiation based on competing code size and performance requirements. For example, determining this balance can include fusing bias+ activation operations into convolutions to reduce memory traffic, and/or fusing all pointwise convolutions into surrounding (e.g., prior and/or subsequent) operations.

In one or more implementations, front end 800 and/or loop interface 802 can determine (e.g., for control of loop optimizer 804 by loop interface 802), directives for situational transformation (e.g., unrolling) of depthwise convolutions, situational fusing of an operation such as a (separable convolution+bias+activation+point wise convolution) operation into the computation of a subsequent depthwise convolution, unrolling the innermost two layers of pointwise convolution, and/or statically setting bounds information on tensors. Statically setting bounds information on tensors can cooperate with unrolling optimization operations by removing additional memory instructions and runtime tests for sizes entirely. In one or more implementations, front end 800 and/or loop interface 802 can provide an efficient application programming interface (API) to pass buffers with known bounds to kernels generated by the loop interface 802 (e.g., using loop optimizer 804 and/or compiler 221). In one or more implementations, front end 800 and/or loop interface 802 can provide a stack allocator with aggressive reuse of memory for optimization of the executable machine learning model. In one or more implementations, front end 800 and/or loop interface 802 can utilize, for example, callback-based allocation to ensure bounded memory use (e.g., to prevent the executable machine learning model from allocating memory during execution time) for optimization of the executable machine learning model.

Figure 10:
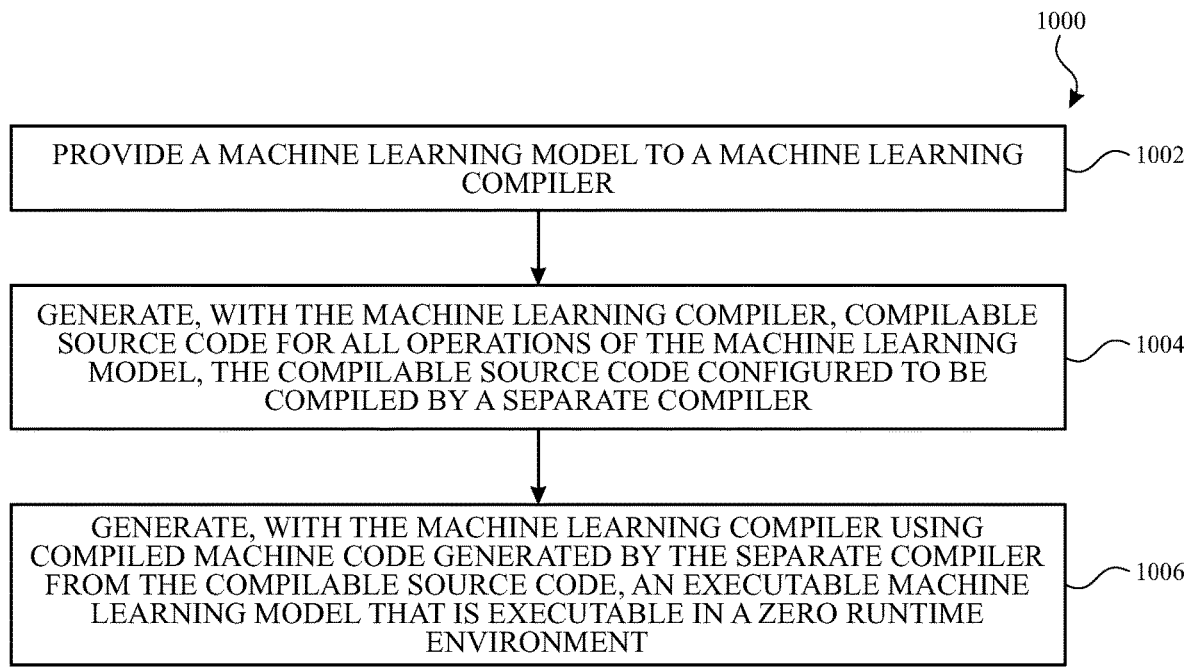
FIG. 10 illustrates a flow diagram of an example process for generating an executable machine learning model in accordance with one or more implementations.

FIG. 10 illustrates a flow diagram of an example process for generating an executable machine learning model using a machine learning compiler in accordance with one or more implementations. For explanatory purposes, the process 1000 is primarily described herein with reference to the electronic device 110 of FIG. 1. However, the process 1000 is not limited to the electronic device 110 of FIG. 1, and one or more blocks (or operations) of the process 1000 may be performed by one or more components of the server 120 and/or by other suitable devices. Further for explanatory purposes, the blocks of the process 1000 are described herein as occurring in serial, or linearly. However, multiple blocks of the process 1000 may occur in parallel. In addition, the blocks of the process 1000 need not be performed in the order shown and/or one or more blocks of the process 1000 need not be performed and/or can be replaced by other operations.

At block 1002, a machine learning model, such as ML model 302 may be provided to a machine learning compiler such as ML compiler 218. For example, the ML model may have been generated using a ML composer such as ML composer 214 and including ML library functions from Ml library 216, or using other machine learning model generation tools and/or libraries/resources.

At block 1004, the machine learning compiler may generate compilable source code (e.g., compilable source code such as object oriented code, other structure oriented code, or functional code), such as compilable source code 600 of FIG. 6, for all operations of the machine learning model, the compilable source code configured to be compiled by a separate compiler, such as compiler 221. In one or more implementations, the machine learning model may have been generated using a library (e.g., ML library 216) of previously stored machine learning library functions. Generating the compilable source code (e.g., the compilable source code 600) may include creating a set of machine learning kernels; and optimizing, with a front end of the machine learning compiler, the generated compilable source code for one or more of the operations. In one or more implementations, optimizing the generated compilable source code may include performing memory layout and alignment operations.

Optimizing the generated compilable source code for the one or more of the operations may also include separating, with the front end of the machine learning compiler, one or more of the optimized operations into sub-operations such as loops (e.g., a set of nested loops), determining directions to optimize of the loops, and providing the loops and the directions to optimize of the loops to a loop interface (e.g., loop interface 802) of the machine learning compiler. The directions to optimize may include scheduling directives. The loop interface, using the directions to optimize the loops, may also operate a loop optimizer such as loop optimizer 804 to generate compilable code (e.g., as part of the compilable source code 600) for one or more of the loops.

The set of machine learning kernels may also be optimized. For example, in one or more implementations, optimizing the generated compilable source code for one or more of the operations and optimizing the machine learning kernels comprises balancing a performance metric and a size metric for the executable machine-learning model. In one or more implementations, optimizing the machine learning kernels includes implementing a solution (e.g., a call-back solution, a solution informing the loop interface 802 and/or loop optimizer 804 what memory to reuse, a solution giving the loop interface 802 and/or loop optimizer 804 extra buffers up front for such memory, or other solutions) to bound memory use to prevent the executable machine learning model from allocating memory during execution time. In one or more implementations, optimizing the machine learning kernels includes removing run-time checks as directed by the front end of the machine learning compiler.

At block 1006, the machine learning compiler may generate, using compiled machine code generated by the separate compiler from the compilable source code, an executable machine learning model, such as executable ML model 220, that is executable in a zero-runtime operating environment. In one or more implementations, the executable machine learning model may include platform specific executable code. For example, the executable machine learning model may be targeted for execution by specific hardware. In one or more implementations, the machine learning compiler may generate the executable machine learning model by generating a container including set of machine learning kernels (e.g., kernels 900 as shown in FIG. 9), and wrapper code (e.g., wrapper code 902) for the set of machine learning kernels. The scheduling directives may include directions to optimize the one or more of the loops.

The present disclosure recognizes that the use of such personal information data, in the present technology, can be used to the benefit of users. For example, the personal information data can be used in the inputs to or outputs from neural networks.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of inputs to or outputs from neural networks, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 11:
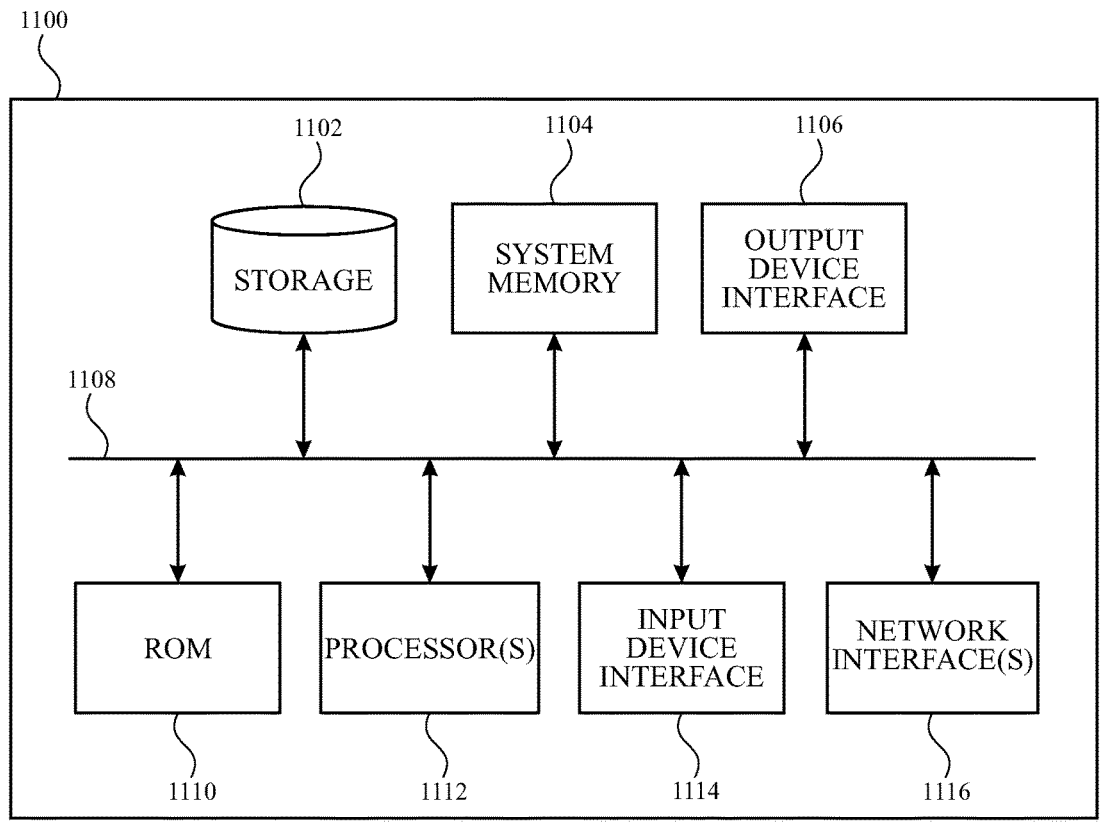
FIG. 11 illustrates an electronic system with which one or more implementations of the subject technology may be implemented.

FIG. 11 illustrates an electronic system 1100 with which one or more implementations of the subject technology may be implemented. The electronic system 1100 can be, and/or can be a part of, the electronic device 110, and/or the server 120 shown in FIG. 1. The electronic system 1100 may include various types of computer readable media and interfaces for various other types of computer readable media. The electronic system 1100 includes a bus 1108, one or more processing unit(s) 1112, a system memory 1104 (and/or buffer), a ROM 1110, a permanent storage device 1102, an input device interface 1114, an output device interface 1106, and one or more network interfaces 1116, or subsets and variations thereof.

The bus 1108 collectively represents all system, peripheral, and chipset buses that communicatively connect the numerous internal devices of the electronic system 1100. In one or more implementations, the bus 1108 communicatively connects the one or more processing unit(s) 1112 with the ROM 1110, the system memory 1104, and the permanent storage device 1102. From these various memory units, the one or more processing unit(s) 1112 retrieves instructions to execute and data to process in order to execute the processes of the subject disclosure. The one or more processing unit(s) 1112 can be a single processor or a multi-core processor in different implementations.

The ROM 1110 stores static data and instructions that are needed by the one or more processing unit(s) 1112 and other modules of the electronic system 1100. The permanent storage device 1102, on the other hand, may be a read-and-write memory device. The permanent storage device 1102 may be a non-volatile memory unit that stores instructions and data even when the electronic system 1100 is off. In one or more implementations, a mass-storage device (such as a magnetic or optical disk and its corresponding disk drive) may be used as the permanent storage device 1102.

In one or more implementations, a removable storage device (such as a floppy disk, flash drive, and its corresponding disk drive) may be used as the permanent storage device 1102. Like the permanent storage device 1102, the system memory 1104 may be a read-and-write memory device. However, unlike the permanent storage device 1102, the system memory 1104 may be a volatile read-and-write memory, such as random access memory. The system memory 1104 may store any of the instructions and data that one or more processing unit(s) 1112 may need at runtime. In one or more implementations, the processes of the subject disclosure are stored in the system memory 1104, the permanent storage device 1102, and/or the ROM 1110. From these various memory units, the one or more processing unit(s) 1112 retrieves instructions to execute and data to process in order to execute the processes of one or more implementations.

The bus 1108 also connects to the input and output device interfaces 1114 and 1106. The input device interface 1114 enables a user to communicate information and select commands to the electronic system 1100. Input devices that may be used with the input device interface 1114 may include, for example, alphanumeric keyboards and pointing devices (also called "cursor control devices"). The output device interface 1106 may enable, for example, the display of images generated by electronic system 1100. Output devices that may be used with the output device interface 1106 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 11, the bus 1108 also couples the electronic system 1100 to one or more networks and/or to one or more network nodes, such as the electronic device 110 shown in FIG. 1, through the one or more network interface(s) 1116. In this manner, the electronic system 1100 can be a part of a network of computers (such as a LAN, a wide area network ("WAN"), or an Intranet, or a network of networks, such as the Internet. Any or all components of the electronic system 1100 can be used in conjunction with the subject disclosure.

In accordance with aspects of the disclosure, a method is provided that includes providing a machine learning model to a machine learning compiler; generating, with the machine learning compiler, compilable source code for all operations of the machine learning model, the compilable source code configured to be compiled by a separate compiler; and generating, with the machine learning compiler using compiled machine code generated by the separate compiler from the compilable source code, an executable machine learning model that is executable in a zero-runtime operating environment.

In accordance with aspects of the disclosure, a device is provided that includes memory storing an executable machine learning model; and one or more processors configured to execute the executable machine learning model to generate a model output, without accessing a runtime library In accordance with aspects of the disclosure, a non-transitory computer-readable medium is provided, storing instructions that, when executed by one or more processors, cause the one or more processors to perform operations that include providing a machine learning model to a machine learning compiler; generating, with the machine learning compiler, compilable source code for all operations of the machine learning model, the compilable source code configured to be compiled by a separate compiler, the compilable source code including code for only a subset of a runtime library that is used by the machine learning model; and generating, with the machine learning compiler using compiled machine code generated by the separate compiler from the compilable source code, an executable machine learning.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
    providing a machine learning model to a machine learning compiler;
    generating, with the machine learning compiler, compilable source code for all operations of the machine learning model, the compilable source code configured to be compiled by a separate compiler; and generating, with the machine learning compiler using compiled machine code generated by the separate compiler from the compilable source code, an executable machine learning model that is executable in a zero-runtime operating environment.

2. The method of claim 1, further comprising generating the machine learning model, wherein generating the compilable source code comprises:
creating a set of machine learning kernels; and
optimizing, with a front end of the machine learning compiler, the generated compilable source code for one or more of the operations.

3. The method of claim 2, further comprising optimizing the machine learning kernels, wherein optimizing the generated compilable source code for one or more of the operations and optimizing the machine learning kernels comprises balancing a performance metric and a size metric for the executable machine learning model.

4. The method of claim 2, further comprising optimizing the machine learning kernels, wherein optimizing the machine learning kernels comprises implementing a callback-based solution to bound memory use to prevent the executable machine learning model from allocating memory during execution time.

5. The method of claim 2, further comprising optimizing the machine learning kernels, wherein optimizing the machine learning kernels comprises removing run-time checks as directed by the front end of the machine learning compiler.

6. The method of claim 2, wherein optimizing the generated compilable source code for the one or more of the operations comprises:
separating, with the front end of the machine learning compiler, the one or more of the operations into loops;
determining directions to optimize the loops; and
providing the loops and the directions to optimize the loops to a loop interface of the machine learning compiler.

7. The method of claim 6, further comprising, with the loop interface and using the directions to optimize the loops, operating a loop optimizer to optimize one or more of the loops.

8. The method of claim 6, wherein the directions to optimize comprise scheduling directives.

9. The method of claim 2, wherein optimizing the generated compilable source code comprises performing memory layout and alignment operations.

10. The method of claim 1, wherein the executable machine learning model comprises platform specific executable code.

11. The method of claim 1, wherein a portion of the compilable source code comprises C code.

12. The method of claim 1, wherein a portion of the compilable source code comprises intermediate representation code for the separate compiler.

13. The method of claim 1, further comprising executing the executable machine learning model in the zero-runtime operating environment to generate a model output.

14. The method of claim 1, further comprising providing, with the machine learning compiler, profiling tools to aid users in tuning machine learning models.

15. A non-transitory computer-readable medium storing instructions that, when executed by one or more processors, cause the one or more processors to perform operations comprising:
providing a machine learning model to a machine learning compiler;
generating, with the machine learning compiler, compilable source code for all operations of the machine learning model, the compilable source code configured to be compiled by a separate compiler, the compilable source code including code for only a subset of a runtime library that is used by the machine learning model; and
generating, with the machine learning compiler using compiled machine code generated by the separate compiler from the compilable source code, an executable machine learning model.

16. The non-transitory computer-readable medium of claim 15, the operations further comprising generating the machine learning model, wherein generating the compilable source code comprises:
creating a set of machine learning kernels; and
optimizing, with a front end of the machine learning compiler, the generated compilable source code for one or more of the operations.

17. The non-transitory computer-readable medium of claim 16, further comprising optimizing the machine learning kernels, wherein optimizing the machine learning kernels comprises implementing a callback-based solution to bound memory use to prevent the executable machine learning model from allocating memory during execution time.

18. The non-transitory computer-readable medium of claim 16, the operations further comprising optimizing the machine learning kernels, wherein optimizing the machine learning kernels comprises removing run-time checks as directed by the front end of the machine learning compiler.

19. A device, comprising:
one or more processors; and
a memory including instructions that are executable by the one or more processors for causing the one or more processor to:
provide a machine learning model to a machine learning compiler;
generate, with the machine learning compiler, compilable source code for all operations of the machine learning model, the compilable source code configured to be compiled by a separate compiler; and
generate, with the machine learning compiler using compiled machine code generated by the separate compiler from the compilable source code, an executable machine learning model that is executable in a zero-runtime operating environment.

20. The device of claim 19, wherein the executable machine learning model comprises platform specific executable code.

* * * * *